(12) United States Patent
Pruss et al.

(10) Patent No.: US 12,384,287 B2
(45) Date of Patent: *Aug. 12, 2025

(54) ENCLOSED BOAT TRAILER

(71) Applicant: Shield Boat Trailers, LLC, Dodge, NE (US)

(72) Inventors: James E. Pruss, Dodge, NE (US); Matthew J. Pruss, Fremont, NE (US)

(73) Assignee: SHIELD BOAT TRAILERS, LLC, Dodge, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/493,448

(22) Filed: Oct. 24, 2023

(65) Prior Publication Data

US 2024/0051451 A1 Feb. 15, 2024

Related U.S. Application Data

(63) Continuation of application No. 17/713,511, filed on Apr. 5, 2022, now Pat. No. 11,794,624, which is a continuation of application No. 17/360,428, filed on Jun. 28, 2021, now Pat. No. 11,292,380, which is a continuation of application No. 17/157,581, filed on Jan. 25, 2021, now Pat. No. 11,046,231.

(60) Provisional application No. 63/113,705, filed on Nov. 13, 2020, provisional application No. 63/055,105, filed on Jul. 22, 2020, provisional application No. 62/965,135, filed on Jan. 23, 2020.

(51) Int. Cl.
*B60P 3/10* (2006.01)

(52) U.S. Cl.
CPC .......... *B60P 3/1066* (2013.01); *B60P 3/1041* (2013.01); *B60P 3/1083* (2013.01)

(58) Field of Classification Search
CPC ...... B60P 3/1066; B60P 3/1041; B60P 3/1083
See application file for complete search history.

(56) References Cited

U.S. PATENT DOCUMENTS

| | | | | |
|---|---|---|---|---|
| 3,077,277 A | * | 2/1963 | Holzman | B60P 3/1066 D12/101 |
| 3,837,509 A | * | 9/1974 | Gladnick | B60P 3/1075 280/414.1 |
| 3,892,320 A | * | 7/1975 | Moore | B60P 3/1066 D12/101 |
| 4,268,212 A | * | 5/1981 | Weary | B60P 3/1075 414/539 |
| 4,278,388 A | * | 7/1981 | Johnson | B60P 3/1066 280/414.1 |
| 4,717,165 A | * | 1/1988 | Johnson | B60P 3/1066 D34/28 |

(Continued)

*Primary Examiner* — Kaitlin S Joerger
(74) *Attorney, Agent, or Firm* — HAMILTON IP LAW; Jay R. Hamilton

(57) ABSTRACT

An illustrative embodiment of an enclosed boat trailer may be configured to allow loading of a boat in the water for the purpose of removing the boat from the water using the enclosed boat trailer to engage the boat for storage and/or transportation. An illustrative embodiment of an enclosed boat trailer may be comprised of a roller system positioned on the floor and a right and left rear arm adjacent a rear opening in the enclosed boat trailer. In an illustrative method of use, a boat operator may load and/or unload the boat into the water from the enclosed boat trailer without leaving the boat and without additional personnel.

13 Claims, 18 Drawing Sheets

(56) References Cited

U.S. PATENT DOCUMENTS

| | | | | |
|---|---|---|---|---|
| 4,997,332 A * | 3/1991 | Johnson | ............... | B60P 3/1066 |
| | | | | 403/385 |
| 5,549,438 A * | 8/1996 | Dwyer | ................ | B60P 3/10 |
| | | | | 414/559 |
| 10,065,551 B1 * | 9/2018 | Zanette | ................ | B60P 3/1033 |
| 11,046,231 B1 * | 6/2021 | Pruss | ................ | B60P 3/1041 |
| 11,292,380 B2 * | 4/2022 | Pruss | ................ | B60P 3/1075 |
| 11,794,624 B2 * | 10/2023 | Pruss | ................ | B60P 3/1041 |
| 2004/0011273 A1 * | 1/2004 | Gorbutt | ................ | B60P 3/1075 |
| | | | | 114/344 |
| 2008/0036174 A1 * | 2/2008 | Nieman | ................ | B60P 3/1041 |
| | | | | 280/414.1 |
| 2018/0281658 A1 * | 10/2018 | Thorley | ................ | B60P 3/1075 |
| 2020/0039415 A1 * | 2/2020 | Bacon | ................ | B60P 3/1066 |

* cited by examiner

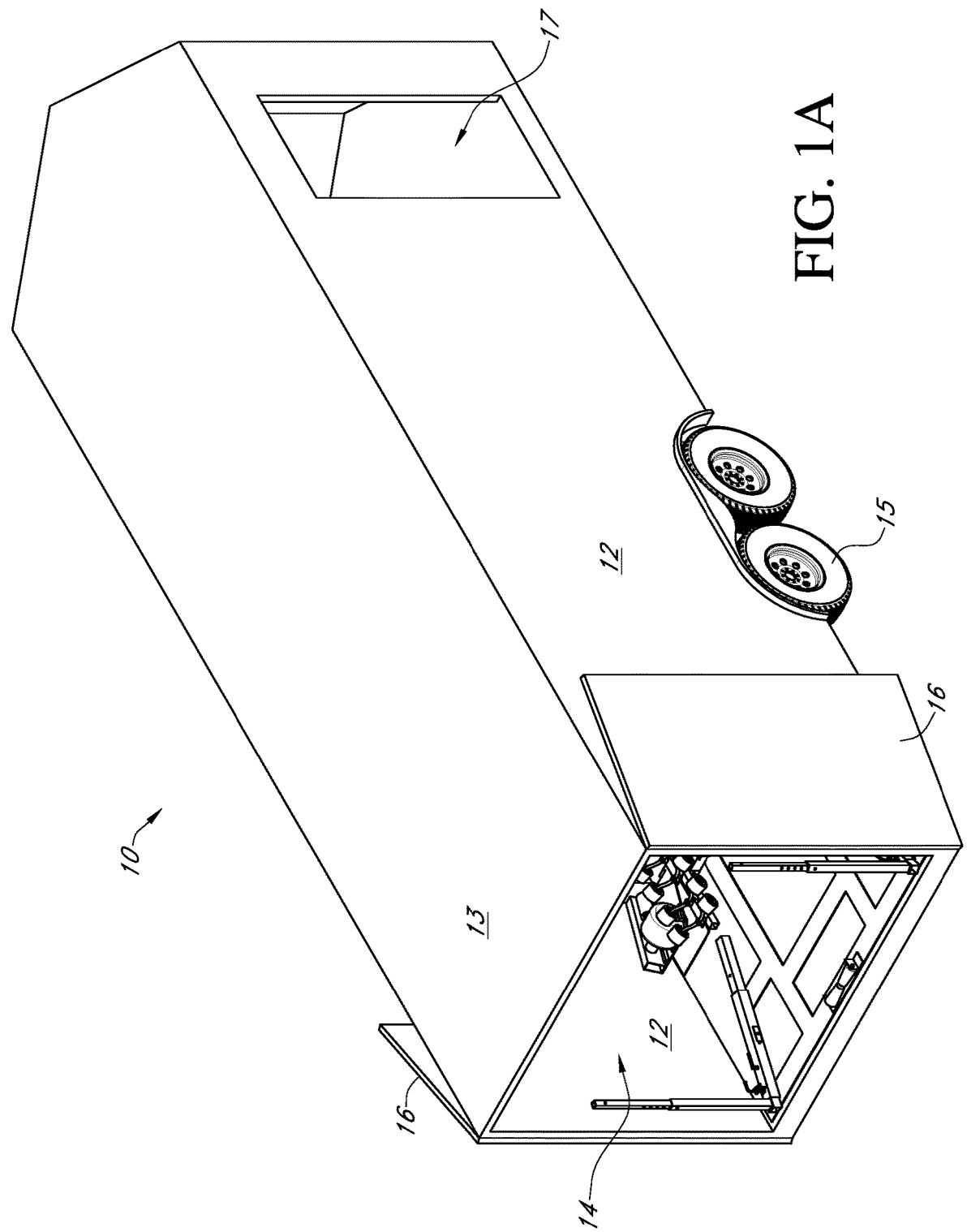

ENCLOSED BOAT TRAILER

CROSS REFERENCE TO RELATED APPLICATIONS

The present nonprovisional patent application claim priority from and is a continuation of U.S. patent application Ser. No. 17/713,511 filed on Apr. 5, 2022 (now U.S. Pat. No. 11,794,624), which application claims priority from and is a continuation of U.S. patent application Ser. No. 17/360,428 filed on Jun. 28, 2021 (now U.S. Pat. No. 11,292,380), which application claims priority from and is a continuation of U.S. patent application Ser. No. 17/157,581 filed on Jan. 25, 2021 (now U.S. Pat. No. 11,046,231), which application claimed priority from provisional U.S. Pat. App. Nos. 62/965,135 filed on Jan. 23, 2020; 63/055,105 filed on Jul. 22, 2020; and 63/113,705 filed on Nov. 13, 2020, all of which patent applications are incorporated by reference herein in their entireties.

STATEMENT REGARDING FEDERALLY SPONSORED RESEARCH OR DEVELOPMENT

No federal funds were used to create or develop the invention herein.

REFERENCE TO SEQUENCE LISTING, A TABLE, OR A COMPUTER PROGRAM LISTING COMPACT DISK APPENDIX

N/A

BRIEF DESCRIPTION OF THE DRAWINGS

The accompanying drawings, which are incorporated in and constitute a part of this specification, illustrate embodiments and together with the description, serve to explain and illustrate the principles of the enclosed boat trailer as disclosed herein.

FIG. 1A is a perspective view of an illustrative embodiment of an enclosed boat trailer with the rear doors in an open position.

DETAILED DESCRIPTION

Figure 1B:
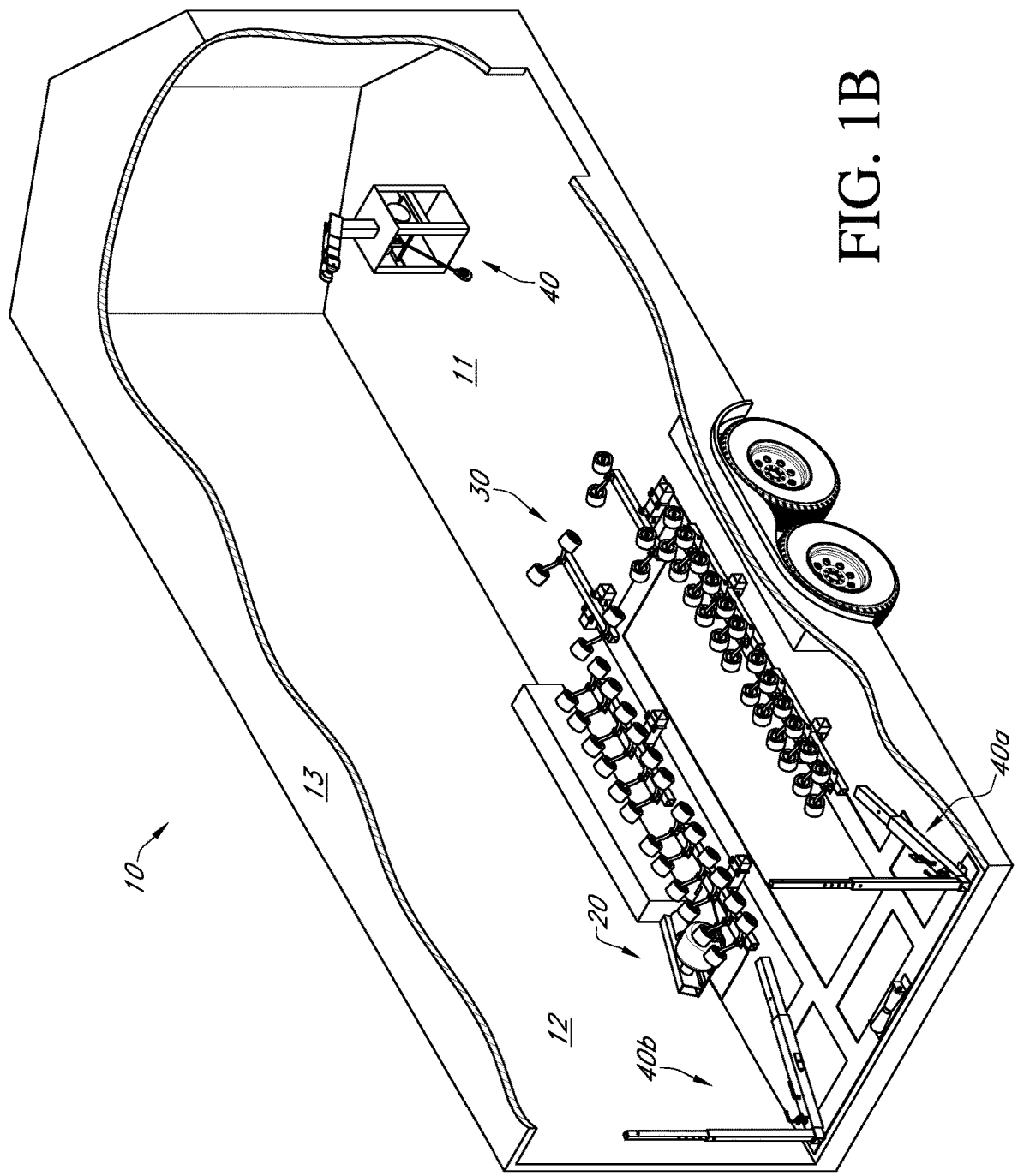
FIG. 1B is a perspective view of the illustrative embodiment of the enclosed boat trailer shown in FIG. 1A with a portion of the wall and roof removed to show the interior of the enclosed boat trailer.

| Element Description | Element Number |
|---|---|
| Enclosed Boat Trailer | 10 |
| Floor | 11 |
| Wall | 12 |
| Roof | 13 |
| Rear opening | 14 |
| Wheel | 15 |
| Rear door | 16 |
| Forward door | 17 |
| Boat | 18 |
| Boat hull | 18a |
| Launch Assist System | 20 |
| Arm | 21 |
| Biasing member | 22 |
| Wheel | 24 |
| Motor | 26 |
| Roller system | 30 |
| Roller pair | 31 |
| Roller wheel | 31a |
| Roller axle | 31b |
| Roller mounting beam | 32 |
| Mounting beam rocker | 32a |
| Central roller | 33 |
| Lower plate | 34 |
| Cross plate | 34a |
| Coupling member | 35 |
| First yoke | 35a |
| Second yoke | 35b |
| Lower support base | 36 |
| U-bolt | 37 |
| U-bolt plate | 38 |
| Right rear arm | 40a |
| Left rear arm | 40b |
| Horizontal portion | 42 |
| Horizontal extender | 42a |
| Upper portion | 44 |
| Upper extender | 44a |
| Contact portion | 46 |
| Winch | 40 |
| Spool | 42 |
| Cable | 44 |

Before the present methods and apparatuses are disclosed and described, it is to be understood that the methods and apparatuses are not limited to specific methods, specific components, or to particular implementations. It is also to be understood that the terminology used herein is for the purpose of describing particular embodiments/aspects only and is not intended to be limiting. As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Aspect" when referring to a method, apparatus, and/or component thereof does not mean that limitation, functionality, component etc. referred to as an aspect is required, but rather that it is one part of a particular illustrative disclosure and not limiting to the scope of the method, apparatus, and/or component thereof unless so indicated in the following claims.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

It is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

Figure 1C:
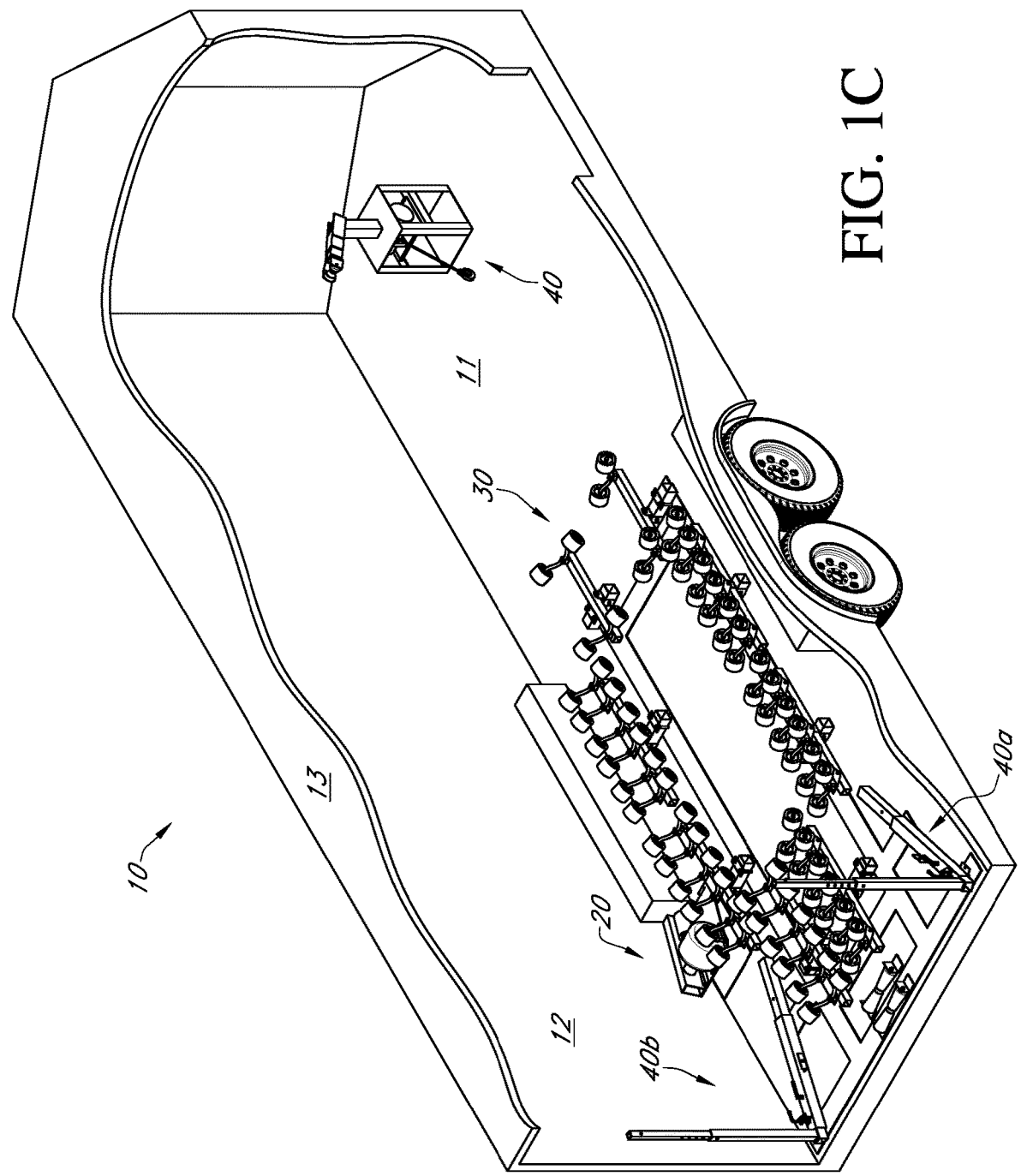
FIG. 1C is a perspective view of another illustrative embodiment of the enclosed boat trailer with a differently configured roller system.

Referring now to the drawings, FIGS. 1A & 1B provide perspective views of an illustrative embodiment of an enclosed boat trailer 10, which may be configured to be supported by a plurality of wheels 15 for towing by a primary mover. As shown in FIG. 1B, a portion of the roof and right-side wall are removed to show an interior portion of the enclosed boat trailer 10. Another illustrative embodiment of an enclosed boat trailer 10 is shown in FIG. 1C, wherein the illustrative embodiment in FIG. 1B has a differently configured roller system 30 compared to that shown in FIG. 1C as described in further detail below.

Generally, the illustrative embodiments of an enclosed boat trailer 10 may be backed into or near a body of water for loading and/or unloading a boat 18 into the enclosed boat trailer 10. The enclosed boat trailer 10 may be configured with wide-opening, side-hinged rear doors 16 at a rear opening 14 and a roller system 30 (which may be moveable and responsive to contact with the boat hull 18a) engaged with a portion of the floor 11 of the enclosed boat trailer 10 such that the boat 18 operator may directly drive a boat 18 from the water into the enclosed boat trailer 10 without assistance from another individual. The illustrative embodiment of an enclosed boat trailer 10 may also be configured with a forward door adjacent a front portion of the enclosed boat trailer 10. It is contemplated that a forward door 17 may allow relatively easy access to an interior portion of the enclosed boat trailer 10 even when a boat 18 positioned therein.

The illustrative embodiments of an enclosed boat trailer 10 may also allow a boat 18 operator to unload a boat 18 from the trailer while inside the boat 18 and without assistance from another individual, and/or in less time and/or with less effort than compared to trailers found in the prior art. The additional time and/or personnel required when using prior art trailers may be at least due to the prior art trailer requiring a single operator to get in and out of the boat 18 various times to properly align the boat 18 with the trailer, engage the cable with the boat 18, operate the winch, manual move the boat 18 with respect to the trailer, etc. without limitation unless otherwise indicated in the following claims. Although the illustrative embodiments of an enclosed boat trailer 10 may be configured to accommodate a boat 18 that is approximately eight feet wide, other configurations, dimensions, etc. to accommodate differently sized, shaped, and/or configured boats 18 without limitation unless otherwise indicated in the following claims. The scope of the enclosed boat trailer 10 is not limited to any specific advantage over prior art boat trailers and/or shortfall of prior art boat trailers unless otherwise indicated in the following claims.

Generally, the various components of an enclosed boat trailer 10 for the illustrative embodiments thereof described in detail below (e.g., winch 14, launch assist system 20, roller system 30, structures and/or methods for engaging the roller system 30 with the floor 11, rear arms 40a, 40b, etc.) may be modular in nature such that an existing enclosed trailer of the proper dimensions and/or specifications may be converted to an enclosed boat trailer 10. Alternatively, a trailer may be configured as an enclosed boat trailer 10 initially during the manufacturing of the trailer itself without limitation unless otherwise indicated in the following claims. Accordingly, the scope of the enclosed boat trailer 10 is not limited to retrofit kits, original equipment, etc. unless otherwise indicated by the following claims, and the optimal configuration of the enclosed boat trailer 10 and various components thereof (e.g., winch 14, launch assist system 20, roller system 30, structures and/or methods for engaging the roller system 30 with the floor 11, rear arms 40*a*, 40*b*, etc.) will vary from one application to the next and may be dependent on whether the enclosed boat trailer 10 is from a retrofit of an existing trailer or configured as such from the factory.

Figure 2A:
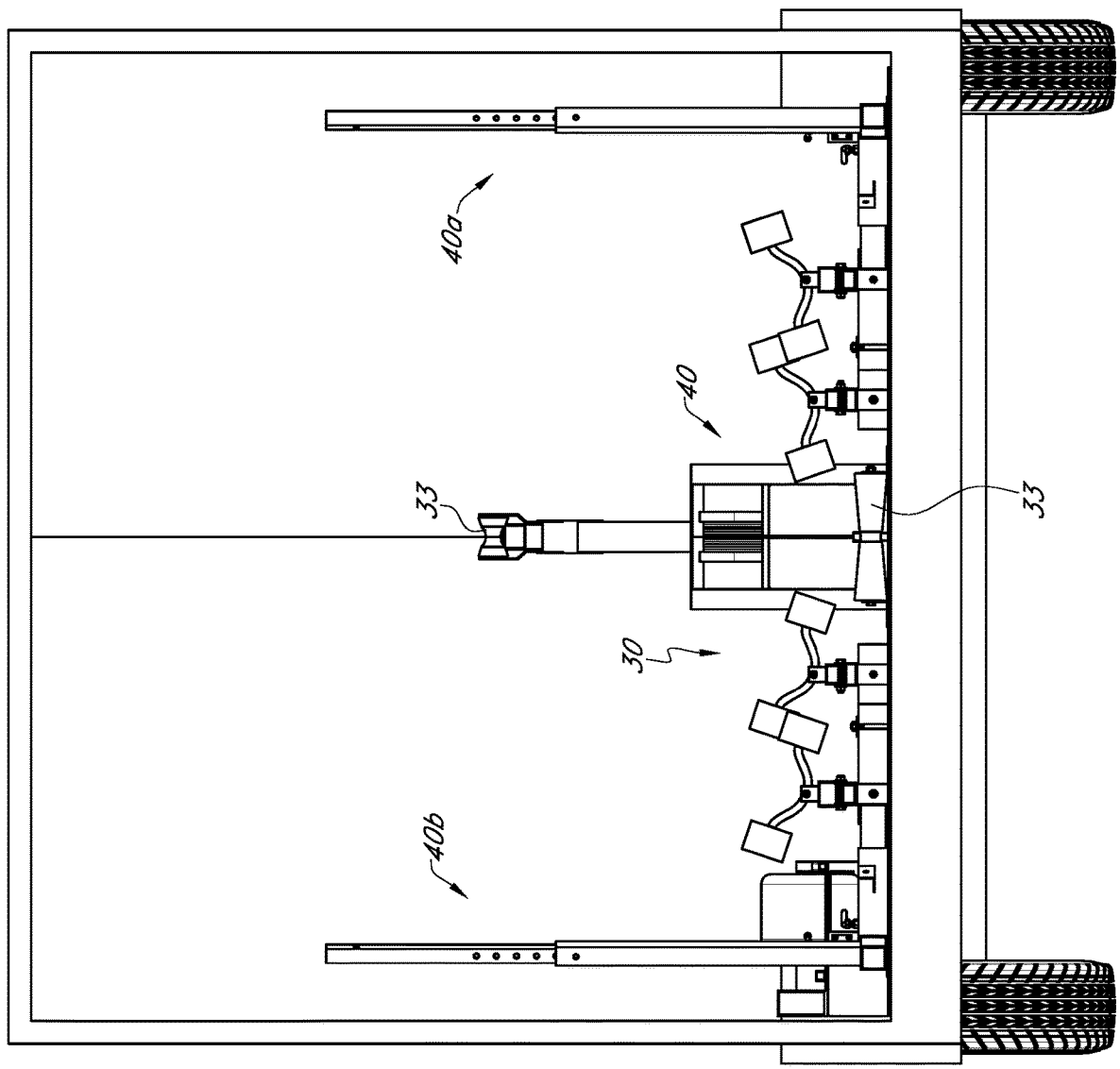
FIG. 2A is a rear view of the illustrative embodiment of an enclosed boat trailer shown in FIGS. 1A & 1B with the rear doors open.
Figure 2B:
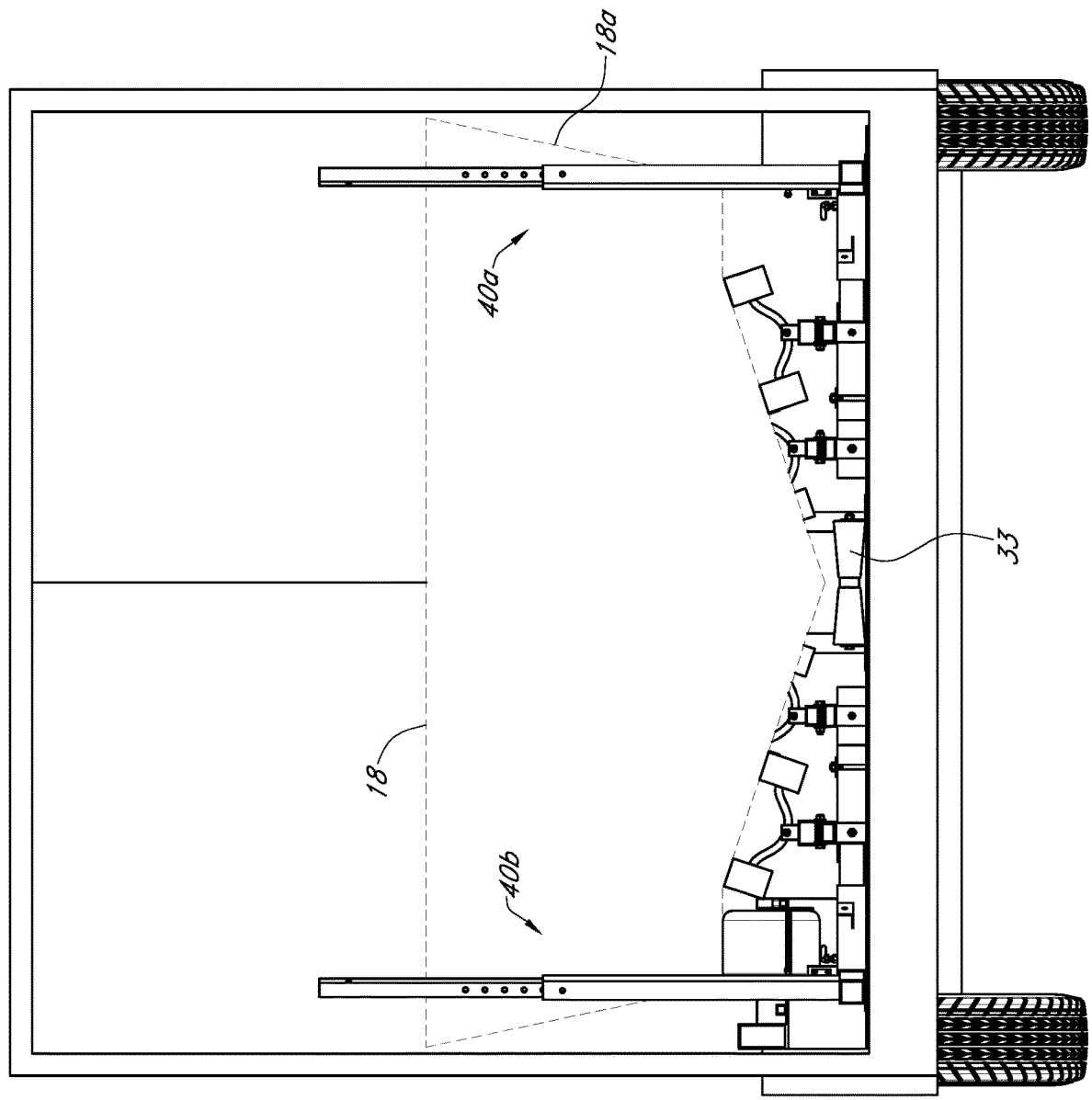
FIG. 2B is another rear view of the illustrative embodiment of an enclosed boat trailer shown in FIGS. 1A & 1B with the rear doors open and a boat positioned in the enclosed boat trailer.

Referring still to FIGS. 1A & 1B (and also FIGS. 2A, 2B, & 3A), an illustrative embodiment of a roller system 30 that may be used with various embodiments of an enclosed boat trailer 10 are shown in more detail. A second illustrative embodiment of a roller system 30 is shown in FIGS. 1C and 3B, wherein various components of the roller system 30 are shared between the two illustrative embodiments. However, the specific configuration, number, and/or arrangement of certain components of the roller system 30 may vary from one embodiment of an enclosed boat trailer 10 to the next, and are therefore in no way limiting to the scope of the present disclosure unless otherwise indicated in the following claims.

As shown, a portion of the bottom surface of the enclosed boat trailer 10 may be configured with a plurality of roller pairs 31 and central rollers 33 extending from the rear adjacent the rear doors 16 forward such that the roller system 30 covers over half the length of the floor 11 of the enclosed boat trailer 10. The roller system 30 may be configured with opposing rows or roller pairs 31 such that there is an approximate line of symmetry fore-to-aft along the centerline of the roller system 30 when viewed as shown in FIG. 3 and left-to-right when viewed as shown in FIGS. 2A & 2B. It is contemplated that during use, one roller pair 31 in the first row of roller pairs 31 will engage a first side of the boat hull 18*a* and a corresponding roller pair 31 in the second row of roller pairs 31 will engage a second side of the boat hull 18*a* at the same or approximately the same lengthwise position on the boat hull 18*a* as the first roller pair 31. In other illustrative embodiments of the enclosed boat trailer 10 not pictured herein, the roller system 30 may be configured differently than roller pairs 31 arranged in opposing rows and may instead be configured merely as opposing rollers without limitation unless otherwise indicated in the following claims.

The optimal configuration and/or dimensions of the roller system 30 (e.g., width, length, distance from rear doors 16, number of roller pairs 31, number of center rollers 33, number of roller pairs 31 engaged with a given roller mounting beam 32, rows, distance from the front of the enclosed boat trailer 10, etc.) will vary from one application of the enclosed boat trailer 10 to the next, and depend at least in part on the type, size, and configuration of the boat 18 to be positioned in the enclosed boat trailer 10. Accordingly, the scope of the enclosed boat trailer 10 is not limited by the specific configuration and/or dimensions of the roller system 30 unless otherwise indicated in the following claims.

Figure 4:
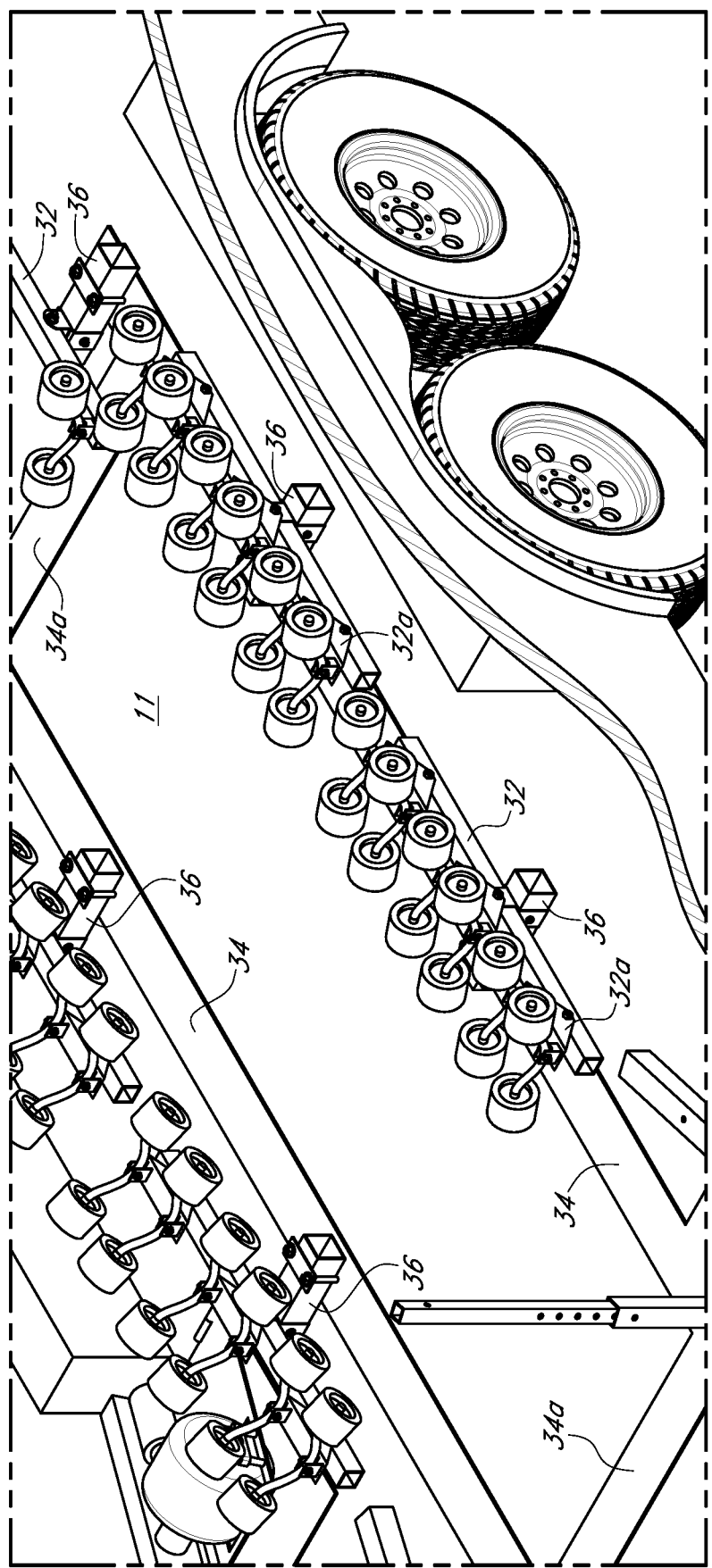
FIG. 4 is a detailed perspective view of a portion of the illustrative embodiment of a roller system.
Figure 5:
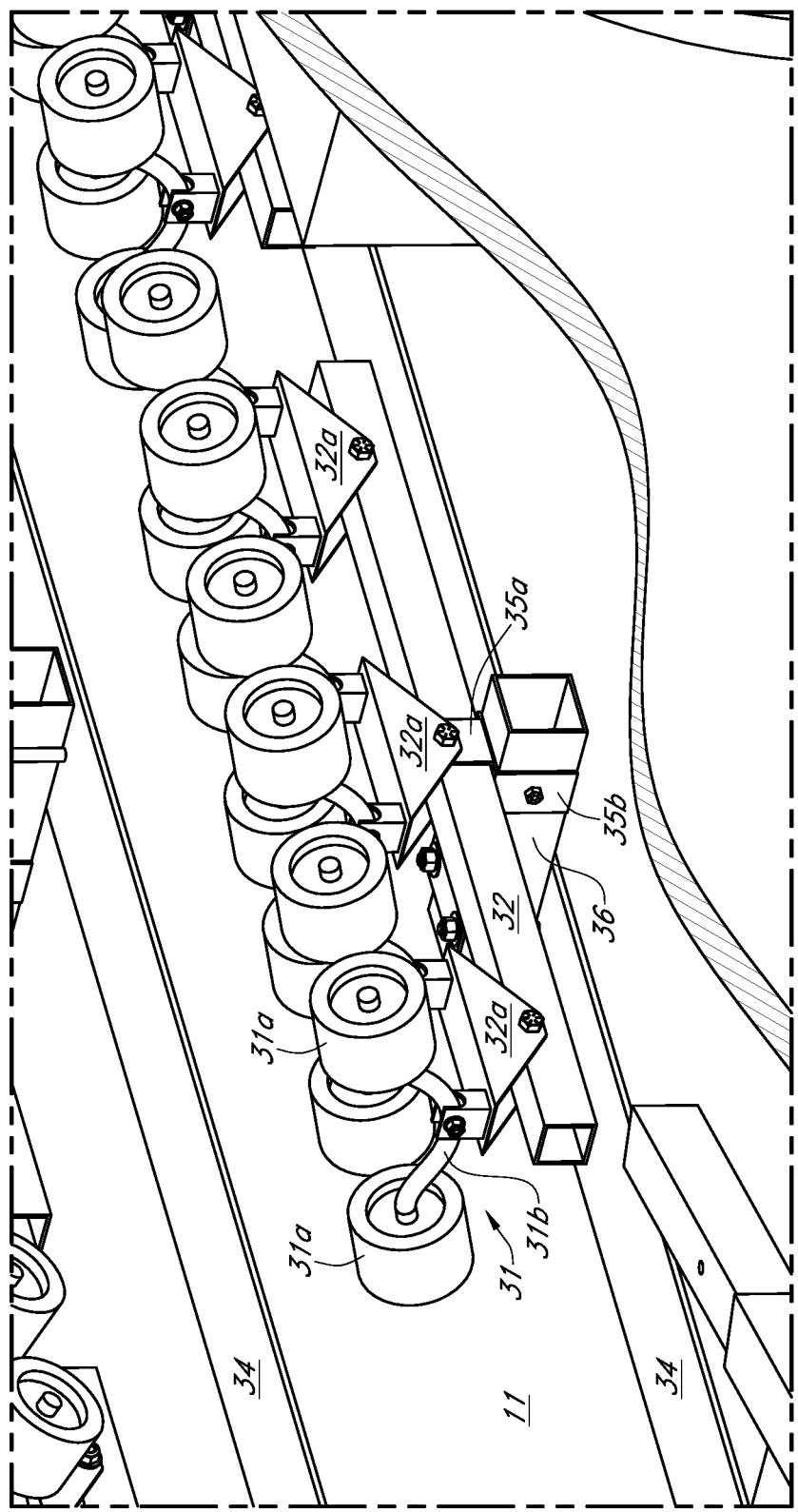
FIG. 5 is another detailed perspective view of a portion of the illustrative embodiment of a roller system toward the rear portion thereof.
Figure 6:
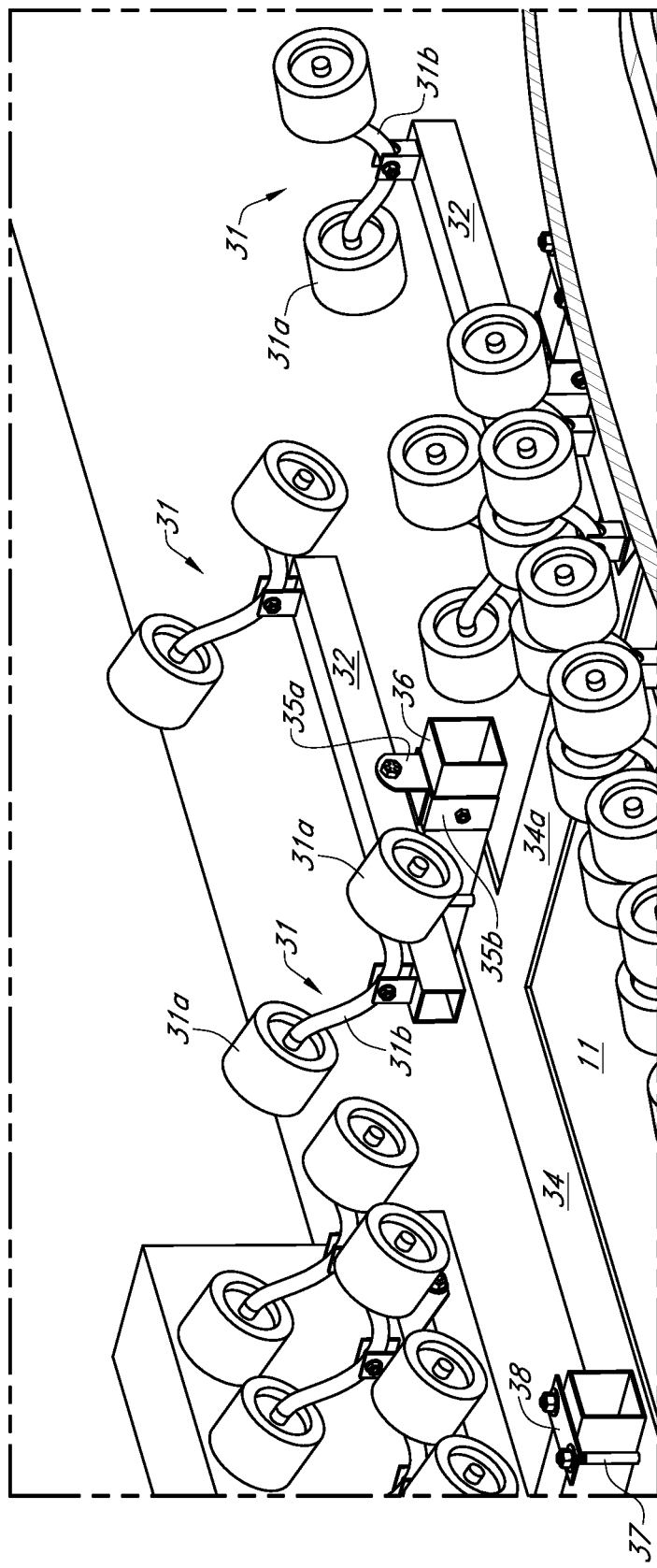
FIG. 6 is another detailed perspective view of a portion of the illustrative embodiment of a roller system toward the front portion thereof.
Figure 7:
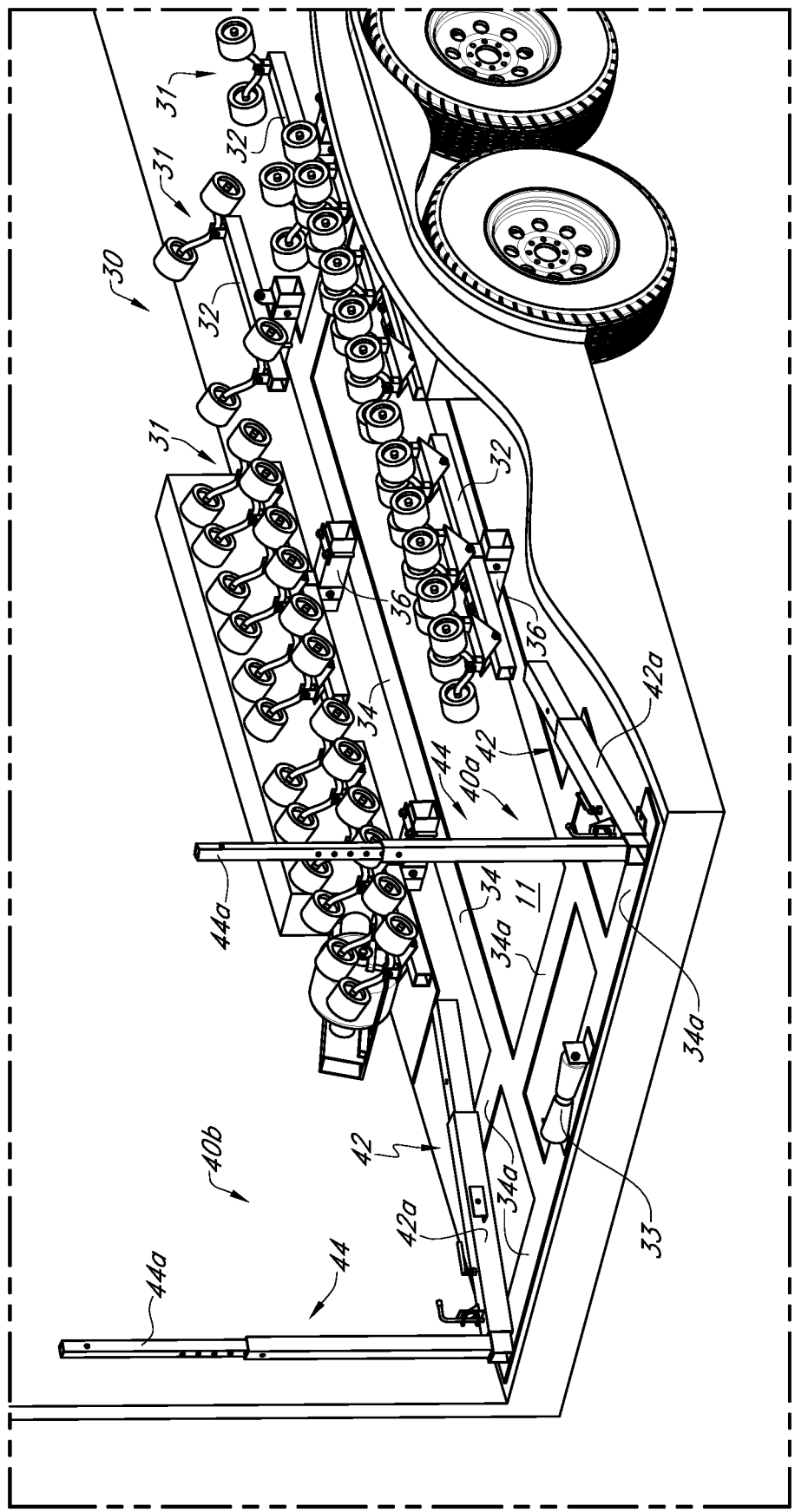
FIG. 7 is another detailed perspective view of a portion of the illustrative embodiment of a roller system toward the rear portion thereof showing the rear arms adjacent the rear opening of the enclosed boat trailer.

Referring now to FIGS. 4-6, the illustrative embodiments of a roller system 30 may be comprised of a plurality of roller pairs 31, wherein each roller pair 31 may include two roller wheels 31*a* on opposite ends of a roller axle 31*b*. The roller wheels 31*a* may be free to rotate with respect to the roller axle 31*b*. The roller axle 31*b* may be pivotally engaged with a roller mounting beam 32, and a single roller mounting beam 32 may provide an engagement point for a plurality of roller axles 31*b*. Generally, the roller axle 31*b* may pivot with respect to the roller mounting beam 32 in such a manner as to account for a predetermined amount of rolling motion and/or roll misalignment of a boat 18 with respect to the enclosed boat trailer 10, and it may also account for a predetermined amount of yaw motion and/or yaw misalignment, but the specific configuration, the amount and/or direction of relative motion and/or misalignment between the boat 18 and the enclosed boat trailer 10 accommodated, and/or pivotal limits between the roller axle 31*b* and roller mounting beam 32 are in no way limiting unless otherwise indicated in the following claims.

As shown, in an illustrative embodiment the two rearward roller mounting beams 32 may be engaged with six roller pairs 31 (and consequently six roller axles 31*b*) generally placed in relatively close proximity to one another along the length of the roller mounting beam 32. In FIG. 6, the illustrative embodiment of the two forwardmost roller mounting beams 32 may be engaged with two roller pairs 31 (and consequently two roller axles 31*b*), wherein each roller pair 31 is generally placed at either end of the roller mounting beam 32. The two forwardmost roller mounting beams 32 may also be spaced from one another by a distance less than the corresponding distance between corresponding roller mounting beams 32 positioned more rearwardly. Such a configuration may allow the roller pairs 31 toward the front of the enclosed boat trailer 10 to better accommodate portions of the boat hull 18*a* adjacent the bow and roller pairs 31 toward the rear of the enclosed boat trailer 10 to better accommodate portions of the boat hull 18*a* adjacent the stern without limitation unless otherwise indicated in the following claims.

Additionally or alternatively, one or more roller axles 31 may be engaged with a roller mounting beam 32 via a mounting beam rocker, as shown at least in FIG. 5. The mounting beam rocker 32 may be pivotally engaged with the roller mounting beam 32 in a manner to account for a determined amount of pitching motion and/or pitch misalignment of a boat 18 with respect to the enclosed boat trailer 10. Finally, the roller mounting beam 32 may be engaged with the floor 11 of the enclosed boat trailer 10 such that it is pivotal with respect to the enclosed boat trailer 10 and in such a manner to account for a determined amount of pitching motion and/or pitch misalignment of a boat 18 with respect to the enclosed boat trailer 10. However, the specific configuration, the amount and/or direction of relative motion and/or misalignment between the boat 18 and the enclosed boat trailer 10 accommodated, and/or pivotal limits between the mounting beam rocker 32*a* and roller mounting beam 32 and/or between the roller mounting beam 32 and floor 11 of the enclosed boat trailer 10 are in no way limiting unless otherwise indicated in the following claims.

The roller system 30 may also include one or more central rollers 33. It is contemplated that a central roller 33 may be configured to engage a keel formed in the boat hull 18*a*. A first central roller 33 may be positioned at the rear of the enclosed boat trailer 10 just forward of the rear opening 14 and may be positioned as low to the floor 11 as possible, as the rearward central roller 33 may serve as the first contact point of the boat 18 with any portion of the enclosed boat trailer 10 during loading. That central roller 33 may serve as a guide for the boat 18 when loading the boat 18 onto the enclosed boat trailer 10 and may help to ensure proper positioning between the boat 18 and enclosed boat trailer 10 and/or help to protect the keel or other portions of the boat hull 18*a* without limitation unless otherwise indicated in the following claims. Another central roller 33 may be positioned toward the front of the enclosed boat trailer 10 and may be elevated above the floor 11 and may also be configured to engage the keel of the boat hull 18*a*. In an illustrative embodiment, the forwardmost central roller 33 may be positioned adjacent a winch 40 positioned toward a forward portion of the enclosed boat trailer 10. Additional or fewer central rollers 33, differently configured and/or positioned central rollers 33, etc. may be used with the roller system 10 without limitation unless otherwise indicated in the following claims.

Although a nearly infinite number of structures and/or methods for engaging a roller system 30 with the floor 11 of the enclosed boat trailer 10 may be used, an illustrative embodiment thereof will now be described in detail with the understanding that the various details and/or components thereof are not to be regarded as limiting unless otherwise indicated in the following claims. It is contemplated that for many applications it may be advantageous to configure the roller system 30 to be as low-profile as possible so as to accommodate a relatively taller boat 18 and/or to reduce the overall height of the enclosed boat trailer 10 without limitation unless otherwise indicated in the following claims. It is further contemplated that an enclosed boat trailer 10 configured as such from the factory may use other structures, methods, and/or components to provide a roller system 30 on the floor 11 of the enclosed boat trailer 10 than those described herein, and such embodiments of an enclosed boat trailer 10 are within the scope of the enclosed boat trailer 10 unless otherwise indicated in the following claims.

Referring specifically to FIGS. 5 & 6, each roller support beam 32 may be pivotally engaged with a lower support base 36, wherein the pivot point of the roller support beam 32 with respect to the lower support base 36 may be generally at the center of the roller support beam 32 with respect to its length, but which may be differently configured in other embodiments of the enclosed trailer 10 without limitation unless otherwise indicated in the following claims. A coupling member 35 may be configured to accommodate the pivotal engagement between a roller support beam 32 and a lower support base 36, wherein the lower support base 36 may be selected engaged with the floor 11 as described in further detail below.

An illustrative embodiment of a coupling member 35 may be comprised of a first yoke 35*a* that engages a roller support beam 32 and generally faces upward and a second yoke 35*b* that engages the lower support base 36 and generally faces downward. The first yoke 35*a* and second yoke 35*b* may be formed as one integral unit and may be rotationally offset from one another by 90 degrees. The roller support beam 32 may be pivotally engaged with the first yoke 35*a* such that the pivot point between the roller support beam 32 and first yoke 35*a* allows for a predetermined amount of angular motion between the roller support beam 32 and coupling member 35 (and consequently between the roller support beam 32 and lower support base 36 and between the roller support beam 32 and floor 11 of the enclosed boat trailer 10). The optimal amount of allowable relative motion therebetween will vary from one application of enclosed boat trailer 10 to the next and is therefore in no way limiting to the scope thereof unless otherwise indicated in the following claims. Additionally, other structures and/or methods may be used to engage a roller support beam 32 with a lower support base 36 without limitation unless otherwise indicated in the following claims.

One or more lower plates 34 may be positioned on the floor 11 of the enclosed boat trailer 10, and each lower support base 36 may be positioned on the upper surface of a lower plate 34. The lower plate 34 may provide added rigidity, structural integrity, ease of use, longevity, or any other suitable purpose without limitation unless otherwise indicated in the following claims. Cross plates 34*a* may be engaged with various lower plates 34 along the length thereof for additional support and/or structure integrity without limitation unless otherwise indicated in the following claims. Generally, the lower plates 34 and lower support bases 36 may be configured such that the opposing rows of roller pairs 31 may be adjusted to accommodate boats 18 having different dimensions and/or configurations. Accommodating for different boat 18 and/or boat hull 18*a* widths may be accomplished by adjusting the lateral position of the lower support base 36 (i.e., the distance of the lower support base 36 from the centerline of the floor 11).

A U-bolt 37 may be positioned under the floor 11 with the studs extending through the floor 11 and on either side of the lower support base 36. A U-bolt plate 38 may be configured with corresponding apertures to accept the studs of the U-bolt 37, such that the lower support base 36 is effectively clamped to the floor 11 via the U-bolt 37 and U-bolt plate 38. In the illustrative embodiments pictured herein, the lower support base 36 may be configured as a length of box-iron that may fit between the studs of the U-bolt 37. By loosening the U-bolt plate 38, the lower support base 36 (and consequently any roller mounting beam 32, roller pair 31, coupling member 35, etc. engaged therewith) may slide laterally along the floor 11 and with respect to the lower plate 34, U-bolt 37, and U-bolt plate 38 to the desired position. When in the desired position, the U-bolt plate 38 may be tightened to the lower support base 36 thereby securing the position of the lower support base 36 on the floor 11. As shown, an illustrative embodiment of an enclosed boat trailer 10 may employ a plurality of lower support bases 36 and corresponding U-bolts 37 and U-bolt plates 38 (one each, respectively, for each roller mounting beam 32), but the specific number, position, configuration, etc. of those components is not limiting unless otherwise indicated in the following claims.

Although specific and detailed reference has been made herein to a lower plate 34, lower support base 36, U-bolt 37, U-bolt plate 38, and coupling member 35 for providing a roller system 30 that allows for adjusting the lateral distance between opposing rows of roller pairs 31, any suitable structure and/or method for adjusting that distance may be used with various embodiments of the enclosed boat trailer 10 without limitation unless otherwise indicated in the following claims. Indeed, it is contemplated that enclosed boat trailers 10 configured as such from the factory may not require at least the lower plates 34, lower support base 36, U-bolt 37, and/or U-bolt plate 38 depending on the specific configuration, or may utilize other structures providing at least the same features and/or functionality of those components as disclosed herein. Such embodiments are fully within the scope of the enclosed boat trailer 10 without limitation unless otherwise indicated in the following claims.

Figure 3A:
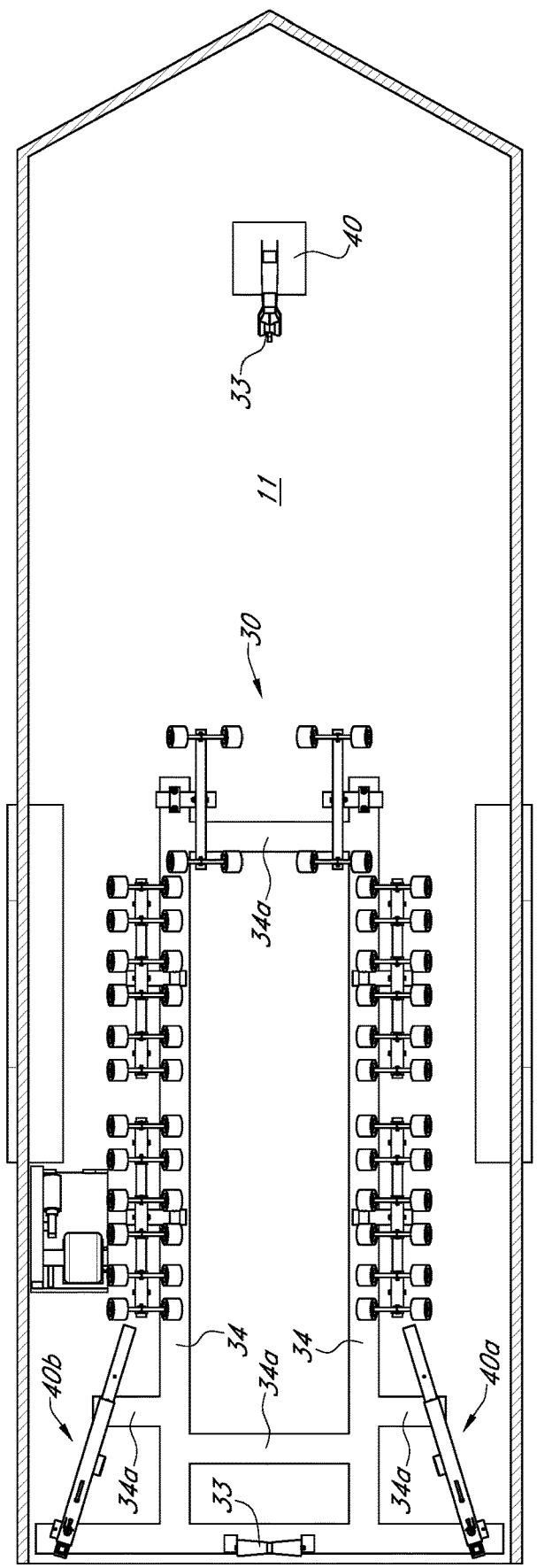
FIG. 3A is a top view of the illustrative embodiment of an enclosed boat trailer from FIG. 1B showing general layout of an illustrative embodiment of a roller system.
Figure 3B:
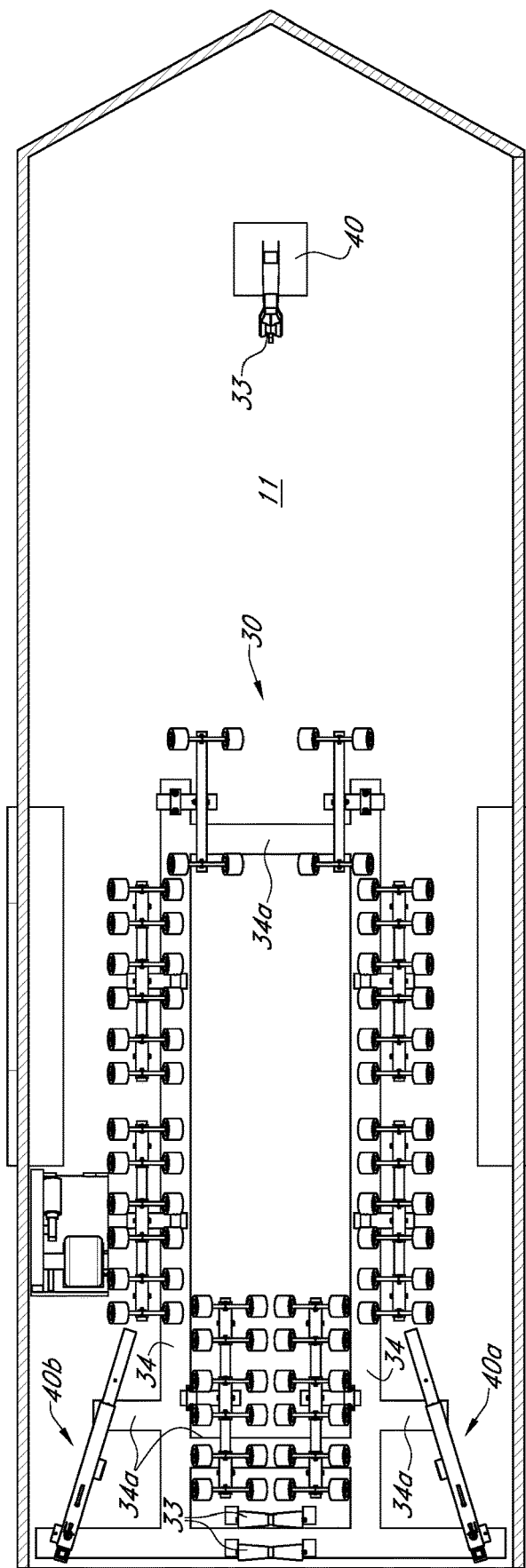
FIG. 3B is a top view of the illustrative embodiment of an enclosed boat trailer from FIG. 1C showing general layout of an illustrative embodiment of a roller system.

As is evident from contrasting the illustrative embodiment of an enclosed boat trailer 10 as shown in FIGS. 1B & 3A with the illustrative embodiment shown in FIGS. 1C & 3B, various configurations of a roller system 30 may be used. By way of illustration, and without limitation unless otherwise indicated in the following claims, the illustrative embodiment shown in FIGS. 1B & 3A may be comprised of three roller mounting beams 32 on each side of the centerline of the enclosed boat trailer 32. The two rearward-most roller mounting beams 32 on a given side of the centerline (wherein each rearward roller mounting beam 32 may be engaged with six roller pairs 31) may be horizontally spaced from the corresponding roller mounting beam 32 on the other centerline by substantially the same distance. The forward-most roller mounting beam 32 on a given side of the centerline (wherein each forward roller mounting beam 32 may be engaged with two roller pairs 31) may also be horizontally spaced from the corresponding roller mounting beam 32 on the other side of the centerline by substantially the same distance. However, the distance between the two corresponding forward-most roller mounting beams 32 may be less than the distance between two corresponding rearward-most roller mounting beams 32 without limitation unless otherwise indicated in the following claims. It is contemplated that such a configuration may accommodate a relatively conventional boat hull 18a configuration having a relatively narrower width adjacent the bow compared to the width adjacent the stern.

By way of illustration, and without limitation unless otherwise indicated in the following claims, the illustrative embodiment shown in FIGS. 1C & 3B may be comprised of four roller mounting beams 32 on each side of the centerline of the enclosed boat trailer 32 and two center rollers 33 positioned adjacent the rear opening 14. Each rearward-most roller mounting beam 32 on a given side of the centerline (wherein each rearward roller mounting beam 32 may be engaged with six roller pairs 31) may be horizontally spaced from the corresponding roller mounting beam 32 on the other centerline by substantially the same distance. The two intermediate roller mounting beams 32 on a given side of the centerline (wherein each intermediate roller mounting beam 32 may be engaged with six roller pairs 31) may be horizontally spaced from the corresponding roller mounting beam 32 on the other centerline by substantially the same distance. However, the distance between the two corresponding rearward-most roller mounting beams 32 may be less than the distance between two corresponding intermediate roller mounting beams 32 without limitation unless otherwise indicated in the following claims. The forward-most roller mounting beam 32 on a given side of the centerline (wherein each forward roller mounting beam 32 may be engaged with two roller pairs 31) may also be horizontally spaced from the corresponding roller mounting beam 32 on the other side of the centerline by substantially the same distance. However, the distance between the two corresponding forward-most roller mounting beams 32 may be less than the distance between two corresponding intermediate roller mounting beams 32 and may be greater than the distance between the two corresponding rearward-most roller mounting beams 32 without limitation unless otherwise indicated in the following claims. It is contemplated that such a configuration may accommodate a relatively conventional boat hull 18a configuration having a relatively narrower width adjacent the bow compared to the width adjacent the stern.

Figure 8:
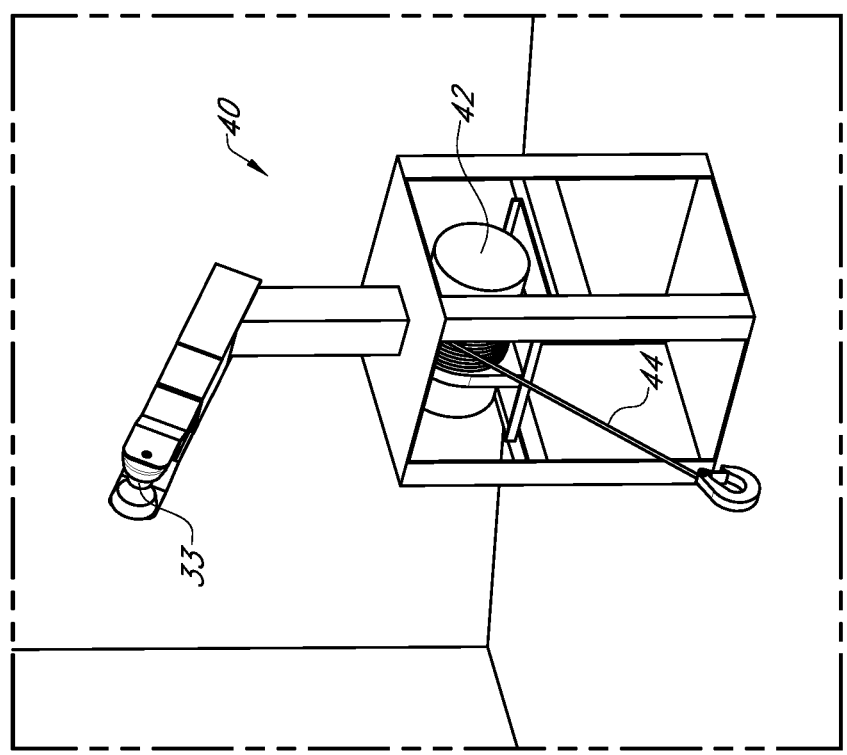
FIG. 8 is a perspective view of an illustrative embodiment of a winch that may be used with various embodiments of the enclosed boat trailer.

Referring now to FIG. 8, an illustrative embodiment of an enclosed boat trailer 10 may be configured with a winch 40, wherein the winch 40 may be positioned generally toward the front of the enclosed boat trailer 10 and ahead of the roller system 30. The winch 40 may be configured with a spool 42 and cable 44, wherein one end of the cable 44 may be configured with a hook to attach to an eyelet engaged with the front of a boat 18. The winch 40 may be powered, wherein the power control may be activated and deactivated remotely, and the winch 40 may simultaneously be configured to allow for manual operation of so desired by the user. Generally, the winch 40 may be used and configured to pull the boat 18 into the enclosed boat trailer 10 and over the roller system 30. It is contemplated that remote activation and/or deactivation of the winch 40 may further facilitate safe and efficient loading and/or unloading of a boat 18 from the enclosed boat trailer 10 by a single operator, wherein the prior art would oftentimes require at least two operators to perform the same task or require a single operator to spend considerably more time than compared to using the enclosed boat trailer 10.

Figure 9:
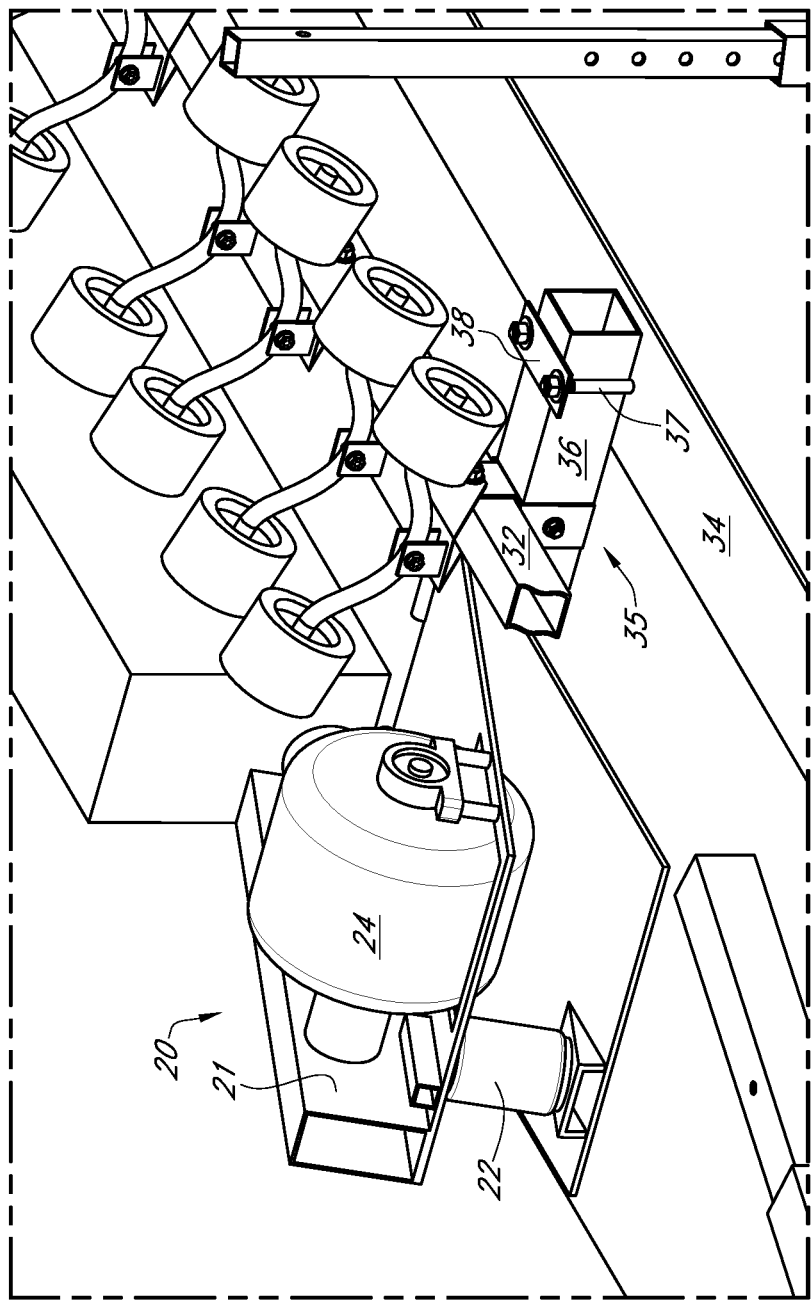
FIG. 9 is a detailed perspective view of an illustrative embodiment of a launch assist system that may be used with various embodiments of the enclosed boat trailer.
Figure 10:
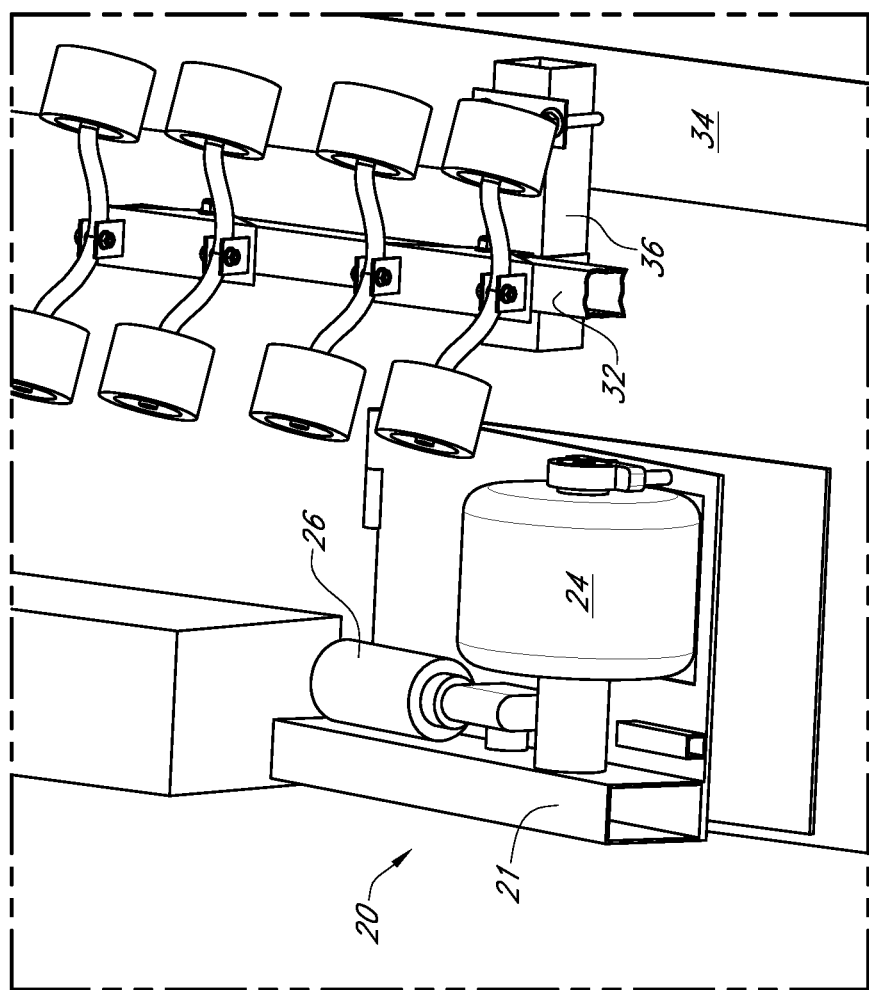
FIG. 10 is another detailed perspective view of an illustrative embodiment of a launch assist system that may be used with various embodiments of the enclosed boat trailer.

Referring now to FIGS. 9 & 10, an illustrative embodiment of the enclosed boat trailer 10 pictured herein may be configured with a launch assist system 20. An illustrative embodiment of a launch assist system 20 may be comprised of a wheel 24, wherein the wheel 24 may be configured such that it is biased against a portion of the hull of a boat 18 positioned within the enclosed boat trailer 10. The wheel 24 may be engaged with a rotational power source, such as an electric motor 26. When the rotational power source is energized, the wheel 24 may turn, thereby urging the boat 18 in one direction or the other (i.e., into or out of the enclosed boat trailer 10) depending on the direction of rotation of the wheel 24.

The wheel 24 may be mounted on a pivoting arm 21, wherein a first end of the pivoting arm 21 may be pivotally engaged with a portion of the enclosed boat trailer 10 and wherein the pivoting arm 21 may be biased in a direction toward the hull of the boat 18 via a biasing member 22 (e.g., mechanical spring, air spring, etc.) acting on the arm 21. In this manner adequate engagement between the surface of the wheel 24 and the hull of the boat 18 may be ensured while simultaneously allowing the position of the wheel 24 to adapt to the shape of the hull, the position of the boat 18 with respect to the enclosed boat trailer 10, and/or to different boats 18. It is contemplated that the launch assist system 20 may aide in initiating motion of the boat 18 out of the enclosed boat trailer 10 (such as when launching the boat 18 in a body of water) and may also aide in ensuring the boat 18 is properly positioned within the enclosed boat trailer 10 when loading the boat 18 (which may be accomplished in or with cooperation with the winch 40 as previously described above). The launch assist system 20 may be used with any suitable embodiment of an enclosed boat trailer 10 as disclosed herein or may be omitted in certain embodiments thereof without limitation unless otherwise indicated in the following claims.

Referring now to FIGS. 11A-11D, an illustrative embodiment of an enclosed boat trailer 10 may be configured with an extendable rear arm 40a, 40b on either side of the enclosed boat trailer 10 at the rear portion thereof. The extendable arms 40a 40b may be configured to help guide a boat 18 into and onto the roller system 30 and into the enclosed boat trailer 10 as described in further detail below.

The illustrative embodiment of an extendable arm 40a, 40b may be configured with a horizontal portion 42 and an upper portion 44. Generally, a right rear arm 40a may be positioned on the right side of the rear opening 14 of the enclosed boat trailer 10 and a left rear arm 40b may be positioned on the left side thereof. The horizontal portion 42 may be engaged with the floor 11 of the enclosed boat trailer 10 and angled with respect to the longitudinal axis thereof. In an illustrative embodiment the horizontal portions may be engaged with a cross plate 34a for additional rigidity and/or structural support without limitation unless otherwise indicated in the following claims. Generally, the upper portion 44 may extend upward and at an angle from the horizontal portion 42. In an illustrative embodiment pictured herein, the upper portion 44 may be engaged with the horizontal portion 42 such that they are generally perpendicular with respect to one another and form an L-shaped member, but other angles and/or configurations may be used without limitation unless otherwise indicated in the following claims. The horizontal and upper portions 42, 44 may be separately formed and then engaged with one another or integrally formed as one piece without limitation unless otherwise indicated in the following claims.

The horizontal portion 42 may include a horizontal extender 42a, such that the length of the horizontal portion 42 may be increased and/or decreased within a certain predetermined range. Similarly, the upper portion 44 may include an upper extender 44a such that the length of the upper portion 44a may be increased and/or decreased within a certain predetermined range. In an illustrative embodiment, both the horizontal extender 42a and upper extender 44a may be configured as telescoping box irons, but any suitable structure and/or method to vary the length of either the horizontal portion 42 or upper portion 44 may be used without limitation unless otherwise indicated in the following claims.

Figure 11A:
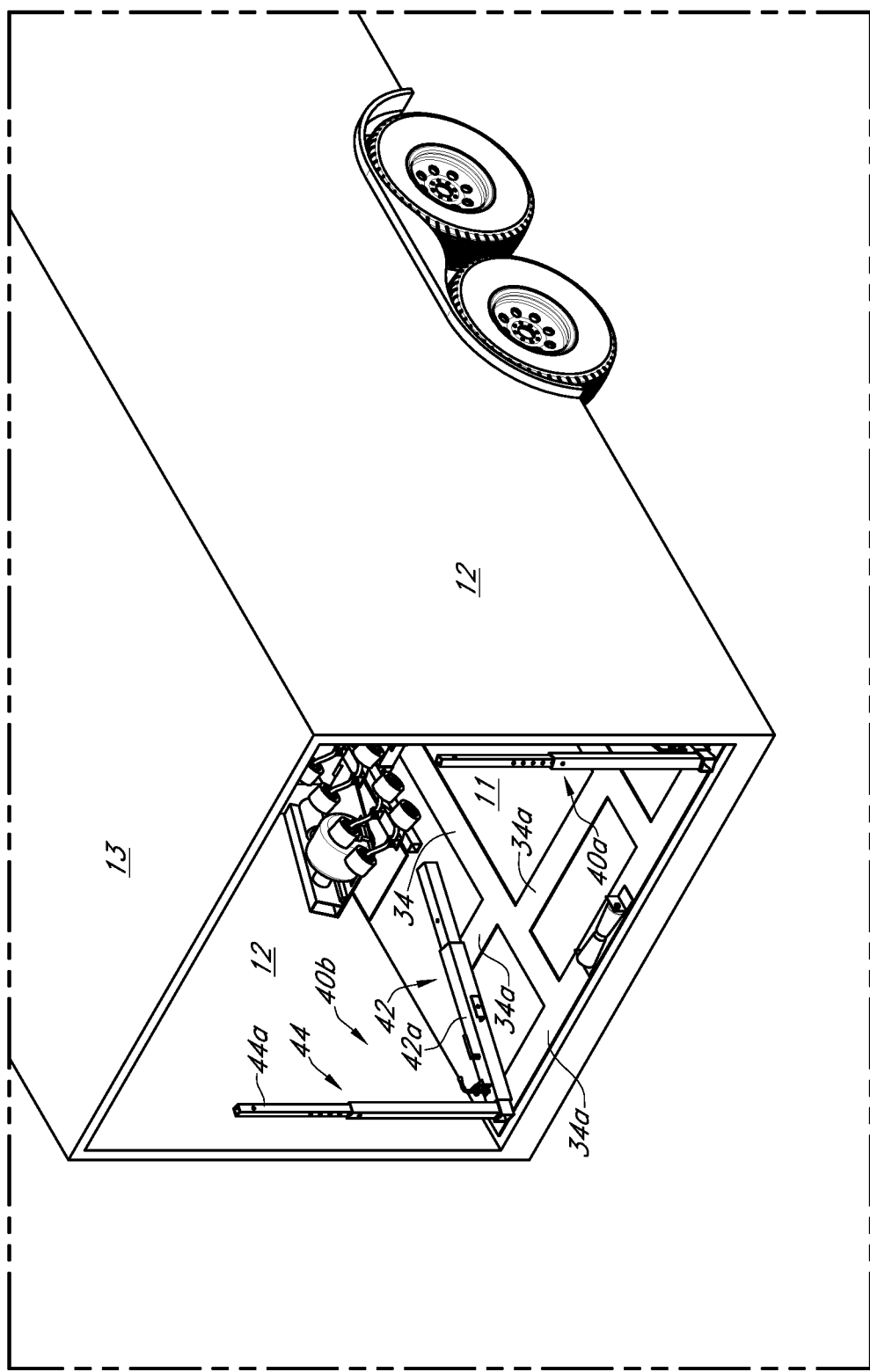
FIG. 11A is a perspective view of an illustrative embodiment of rear arms that may be used with various embodiments of the enclosed boat trailer with the rear arms retracted.
Figure 11B:
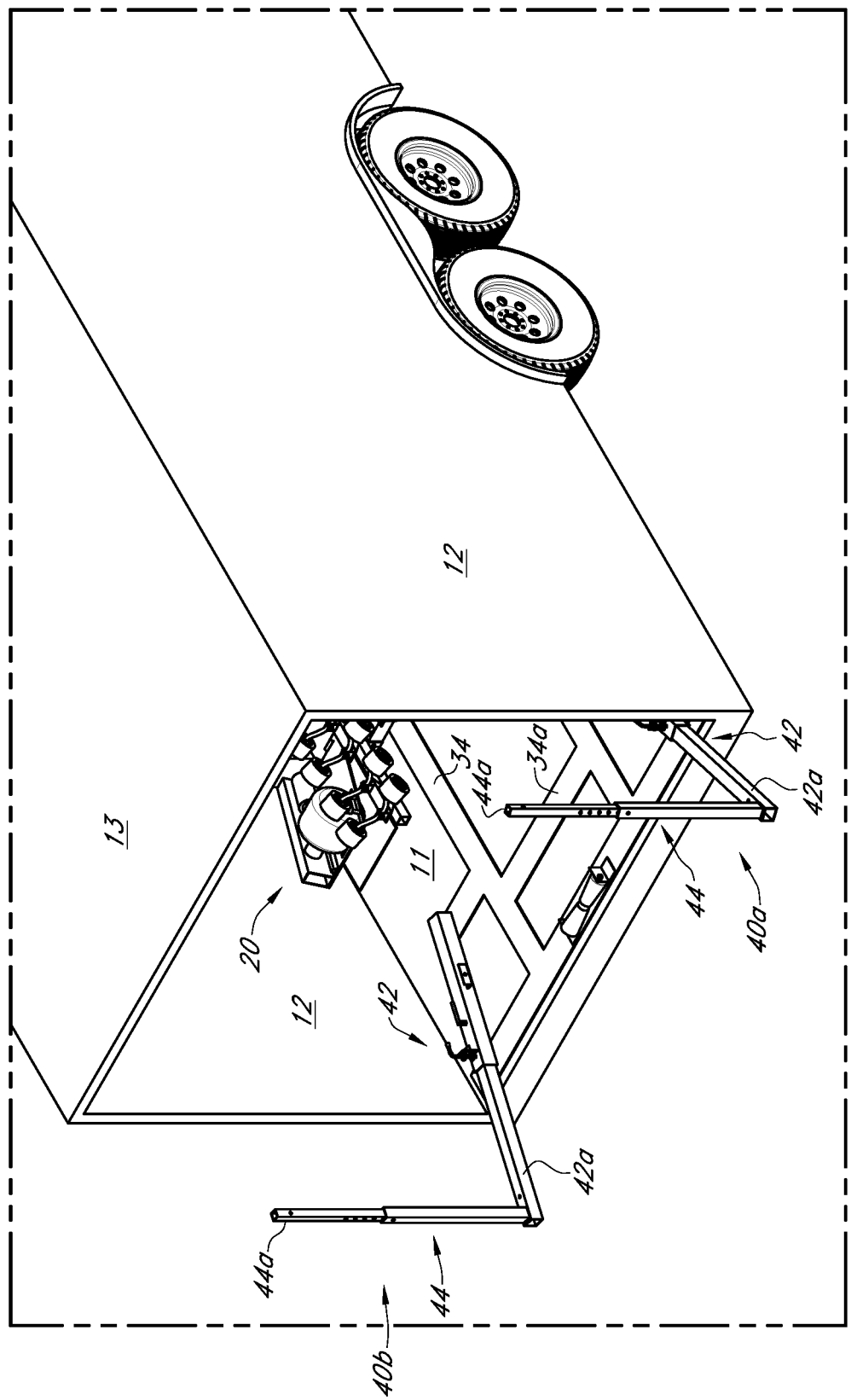
FIGS. 11B & 11C are perspective views of an illustrative embodiment of rear arms shown in FIG. 11A with the rear arms extended in the horizontal dimension, wherein the contact portions are shown in FIG. 11C.
Figure 11C:
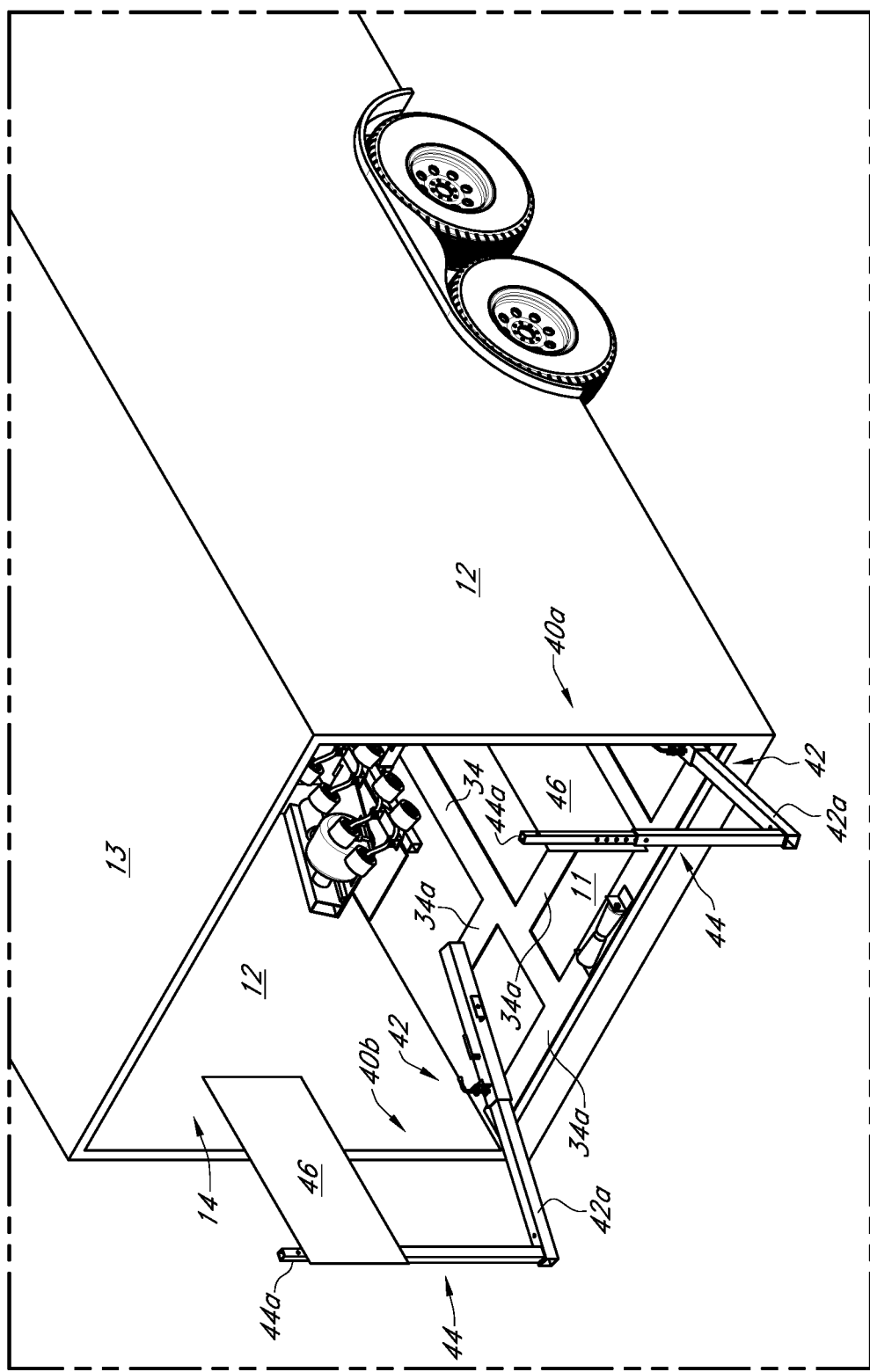
Figure 11D:
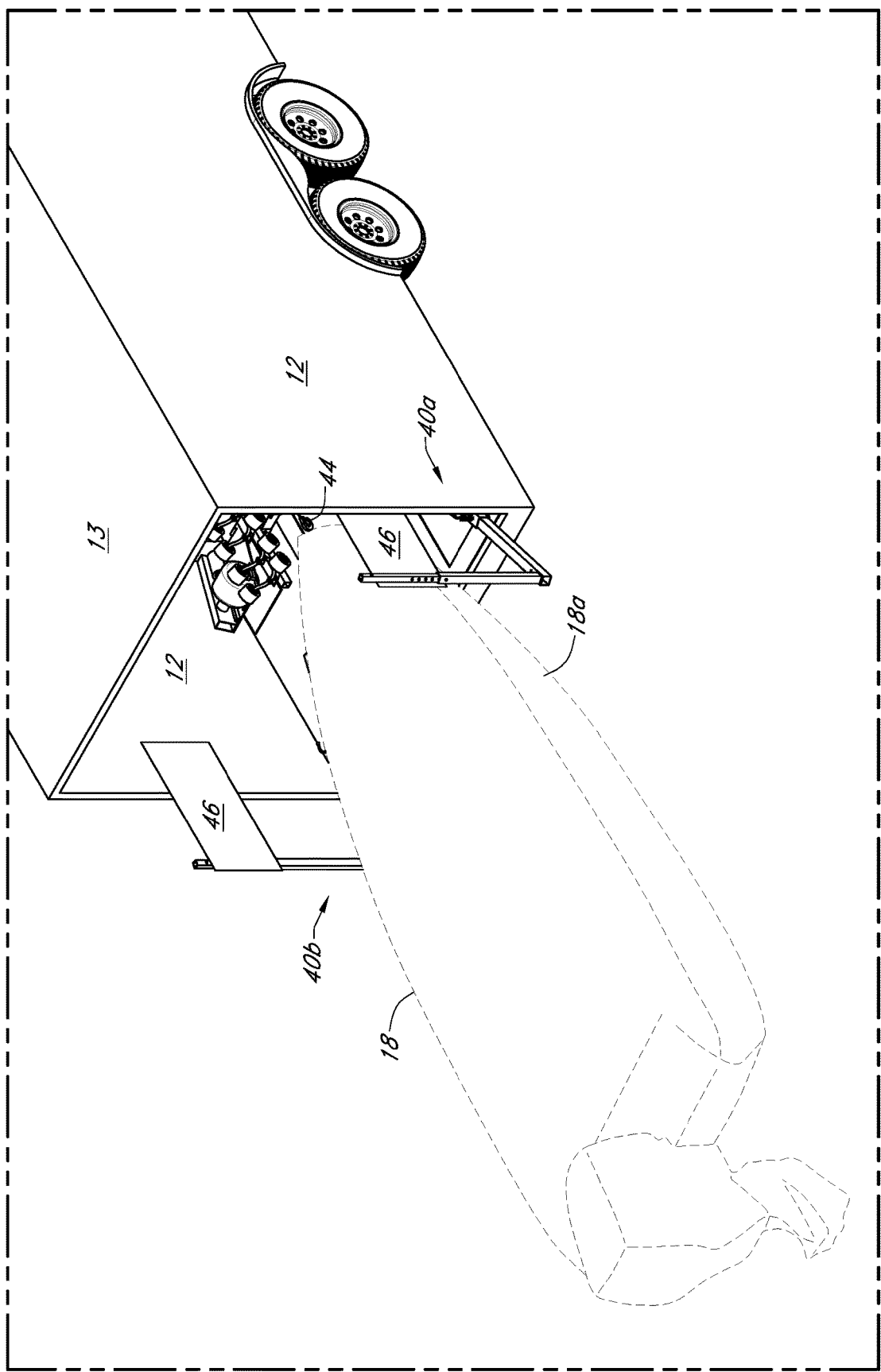
FIG. 11D is a perspective view of the illustrative embodiment of the illustrative embodiment of rear arms shown in FIGS. 11A-11C with a boat positioned therebetween.

As best shown in FIGS. 11C & 11D, the extendible arms 40a, 40b may be configured with a contact portion 46 on an upper of the upper portion 44, wherein the contact portion 46 may be configured to engage a portion of the boat 18 without damaging the boat 18 and/or any component of the enclosed boat trailer 10. That is, the contact portion 46 may be configured to allow slideable engagement with the boat hull 18a or other portions of the boat 18 during the loading and entry process. Accordingly, in an illustrative embodiment the contact portion 46 may be constructed of a polymer and/or plastic material, such as polytetrafluoroethylene, polypropylene, polyester, polyvinyl chloride, other synthetic materials, other natural materials, and/or combinations thereof without limitation unless otherwise indicated in the following claims. Each contact portion 46 may be configured to extend from the upper portion 44 of the respective rear arm 40a, 40b forward through the rear opening 14 so as to prevent and/or mitigate damage that may be caused through unwanted contact of the boat 18 with a portion of the enclosed boat trailer 10 adjacent the rear opening 14 thereof without limitation unless otherwise indicated in the following claims.

It is contemplated that during loading of a boat 18, the horizontal extenders 42a may be extended away from the rear opening 14 of the enclosed boat trailer 10, as shown in FIGS. 11B, 11C, & 11D. The angle of the horizontal portions 42 with respect to the centerline of the enclosed boat trailer 10 provides an angled guide for the boat 18 to aide the boat 18 operator in centering the boat 18 with respect to the roller system 30 and/or enclosed boat trailer 10, wherein the opening between the upper portions 44 and/or contact portions 46 may be wider than the rear opening 14 of the enclosed boat trailer 10 and wherein the upper portions 44 and/or contact portions 46 may extender rearward beyond the rear opening 14. The horizontal extenders 42a may be retracted when not in use such that the rear doors 16 may be fully closed without interference from the rear arms 40a, 40b. The horizontal extenders 42a may also be extended during unloading of a boat 18 without limitation unless otherwise indicated in the following claims.

The upper extenders 44a may be extended and/or retracted for various reasons, including but not limited to account for boats 18 of different configurations (e.g., hull widths, heights, shapes, etc.) and ensure that the contact portion 46 is the only touch point between the boat 18 and the rear arms 40a, 40b. The upper extenders 44a may also be extended and/or retracted to account for the angle of the enclosed boat trailer 10 and roller system 30 (that is, the pitch) with respect to the boat 18, which may vary at least depending on the terrain on which the enclosed boat trailer 10 is positioned during loading and/or unloading.

Accordingly, via the horizontal extender 42a, the distance from and relative angle with respect to the enclosed boat trailer 10 to which the extendable arms 40a, 40b extend may be adjustable, and the optimal distance and angle thereof may vary from one application of the enclosed boat trailer 10 to the next and may be dependent at least on the configuration of the boat 18 for which the enclosed boat trailer 10 is designed. The height of the extendable arms 40a, 40b (and consequently the height of any contact portion 46 and/or other component engaged therewith) may also be adjustable. Accordingly, the specific configuration, dimensions, angles, etc. of the extendable arms 40a, 40b in no way limits the scope of the enclosed boat trailer 10 unless otherwise indicated in the following claims.

Although the illustrative apparatuses and processes described and disclosed herein may be configured for use with a specifically configured roller system 30 comprised of two opposing rows of roller pairs 31, the scope of the present disclosure is not so limited and extends to any beneficial and/or advantageous use and/or configuration thereof without limitation unless so indicated in the following claims.

The materials used to construct the apparatuses and/or components thereof may vary depending on the specific application thereof, but it is contemplated that polymers, synthetic materials, metals, metal alloys, natural materials, and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects and embodiments of the various processes and apparatuses disclosed herein, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the apparatuses and methods and/or embodiments thereof as pictured and described herein are for illustrative purposes only, and the scope of the present disclosure extends to all processes, apparatuses, and/or structures for providing the various benefits and/or features of the present disclosure unless so indicated in the following claims, such as all similar apparatuses for allowing modification or improvement of an enclosed boat trailer 10 including using the various elements disclosed herein as part of the enclosed boat trailer 10 as suitable for the application.

While various apparatuses and methods according to the present disclosure have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the processes and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the apparatuses and methods disclosed herein are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, process steps, process parameters, etc. of the apparatuses and methods disclosed herein may be used alone or in combination with one another depending on the compatibility of the features, components, functionalities, advantages, aspects, configurations, process steps, process parameters, etc. Accordingly, a nearly infinite number of variations of the present disclosure exist. Modifications and/or substitutions of one feature, component, functionality, aspect, configuration, process step, process parameter, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

The invention claimed is:

1. An enclosed boat trailer comprising:
    a) a floor having a centerline along a length of said enclosed boat trailer;
    b) a first wall extending upward from a first edge of said floor;
    c) a second wall extending upward from a second edge of said floor;
    d) a roof connecting an upper edge of said first wall with an upper edge of said second wall;
    e) a rear opening formed at a rear end of said floor, wherein said rear opening is formed from said floor, said first wall, said second wall, and said roof, and wherein said rear opening has a height and a width;
    f) a right rear arm positioned adjacent to a right side of said rear opening, said right rear arm comprising:
        i) a horizontal portion engaged with said floor, wherein said horizontal portion is angled with respect to said centerline;
        ii) an upper portion extending upward from and angled with respect to said horizontal portion; and,
    g) a left rear arm positioned adjacent to a left side of said rear opening, said left rear arm comprising:
        i) a horizontal portion engaged with said floor, wherein said horizontal portion is angled with respect to said centerline;
        ii) an upper portion extending upward from and angled with respect to said horizontal portion.

2. The enclosed boat trailer according to claim 1 further comprising a roller system, said roller system comprising:
    a) a center roller positioned at a centerline of said floor, wherein said center roller is adjacent said rear opening;
    b) a first row having a first plurality of roller pairs positioned to a left side of said centerline; and,
    c) a second row having a first plurality of roller pairs positioned to a right side of said centerline, wherein said first row and said second row are symmetrical with respect to said centerline, and wherein said first row and said second row are spaced from said rear opening by a first distance.

3. The enclosed boat trailer according to claim 1 wherein said horizontal portion of said right rear arm is further defined as having a variable length and further comprises a horizontal extender configured to provide said variable length.

4. The enclosed boat trailer according to claim 3 wherein said upper portion of said right rear arm is further defined as extending beyond said rear opening when said variable length of said horizontal portion is at a maximum.

5. The enclosed boat trailer according to claim 4 wherein said right rear arm further comprises a contact portion engaged with said upper portion of said right rear arm, wherein said contact portion extends from said upper portion of said right rear arm through said rear opening when said variable length of said horizontal portion of said right rear arm is at said maximum.

6. A method of positioning a boat in an enclosed boat trailer, said method comprising the steps of:
    a) positioning a portion of said enclosed boat trailer adjacent a body of water;
    b) maneuvering said enclosed boat trailer such that a rear opening of said enclosed boat trailer is at least partially positioned in said body of water, wherein said enclosed boat trailer comprises:
        i) a right rear arm positioned adjacent to a right side of said rear opening, said right rear arm comprising:
            1. A horizontal portion engaged with said floor and having a variable length, wherein said horizontal portion includes a horizontal extender configured to provide said variable length, and wherein said horizontal portion is angled with respect to said centerline;
            2. An upper portion extending upward from and angled with respect to said horizontal portion, wherein said upper portion is positioned beyond said rear opening when said variable length of said horizontal portion is at a maximum;
        ii) a left rear arm positioned adjacent to a left side of said rear opening, said left rear arm comprising:

1. A horizontal portion engaged with said floor, wherein said horizontal portion is angled with respect to said centerline; and,
2. An upper portion extending upward from and angled with respect to said horizontal portion, wherein a distance between said upper portion of said right rear arm and said upper portion of said left rear arm is greater than said width of said rear opening;

c) positioning said boat in said body of water adjacent said enclosed boat trailer;

d) positioning a portion of said boat adjacent a bow of said boat between said left rear arm and said right rear arm; and, e) moving said boat forward with respect to enclosed boat trailer.

7. The method according to claim 6 wherein said enclosed boat trailer further comprises a launch assist system, said launch assist system comprising:

a) a biasing member;

b) an arm pivotally engaged with said floor at a first end of said arm, wherein said biasing member provides a biasing force to said arm in a direction generally upward from said floor; and, c) a wheel pivotally engaged with a second end of said arm.

8. The method according to claim 7 further comprising the step of extending said horizontal portion of said right rear arm to said maximum.

9. The method according to claim 6 wherein said boat trailer is configured with a roller system, said roller system comprising:

a) a center roller positioned at a centerline of said floor, wherein said center roller is adjacent said rear opening;

b) a first row having a first plurality of roller pairs positioned to a left side of said centerline; and, c) a second row having a first plurality of roller pairs positioned to a right side of said centerline, wherein said first row and said second row are symmetrical with respect to said centerline, and wherein said first row and said second row are spaced from said rear opening by a first distance.

10. The enclosed boat trailer according to claim 1 wherein said left roller mounting beam and said right roller mounting beam are further defined as being pivotal with respect to said floor in a yaw dimension.

11. The enclosed boat trailer according to claim 1 wherein said horizontal portion of said right rear arm is further defined as having a variable length and further comprises a horizontal extender configured to provide said variable length.

12. The enclosed boat trailer according to claim 1 further comprising a roller system, said roller system comprising:

a) a center roller positioned at a centerline of said floor, wherein said center roller is adjacent said rear opening;

b) a first row having a first plurality of roller pairs positioned to a left side of said centerline; and, c) a second row having a first plurality of roller pairs positioned to a right side of said centerline, wherein said first row and said second are pivotable in relation to said floor, wherein said first row and said second row are symmetrical with respect to said centerline, and wherein said first row and said second row are spaced from said rear opening by a first distance.

13. The enclosed boat trailer according to claim 1 further comprising a launch assist system positioned within said trailer, wherein said launch assist system further comprises:

a) a biasing member;

b) an arm pivotally engaged with said floor at a first end of said arm, wherein said biasing member provides a biasing force to said arm in a direction generally upward from said floor; and, c) a wheel pivotally engaged with a second end of said arm.

* * * * *